Patented Aug. 4, 1953

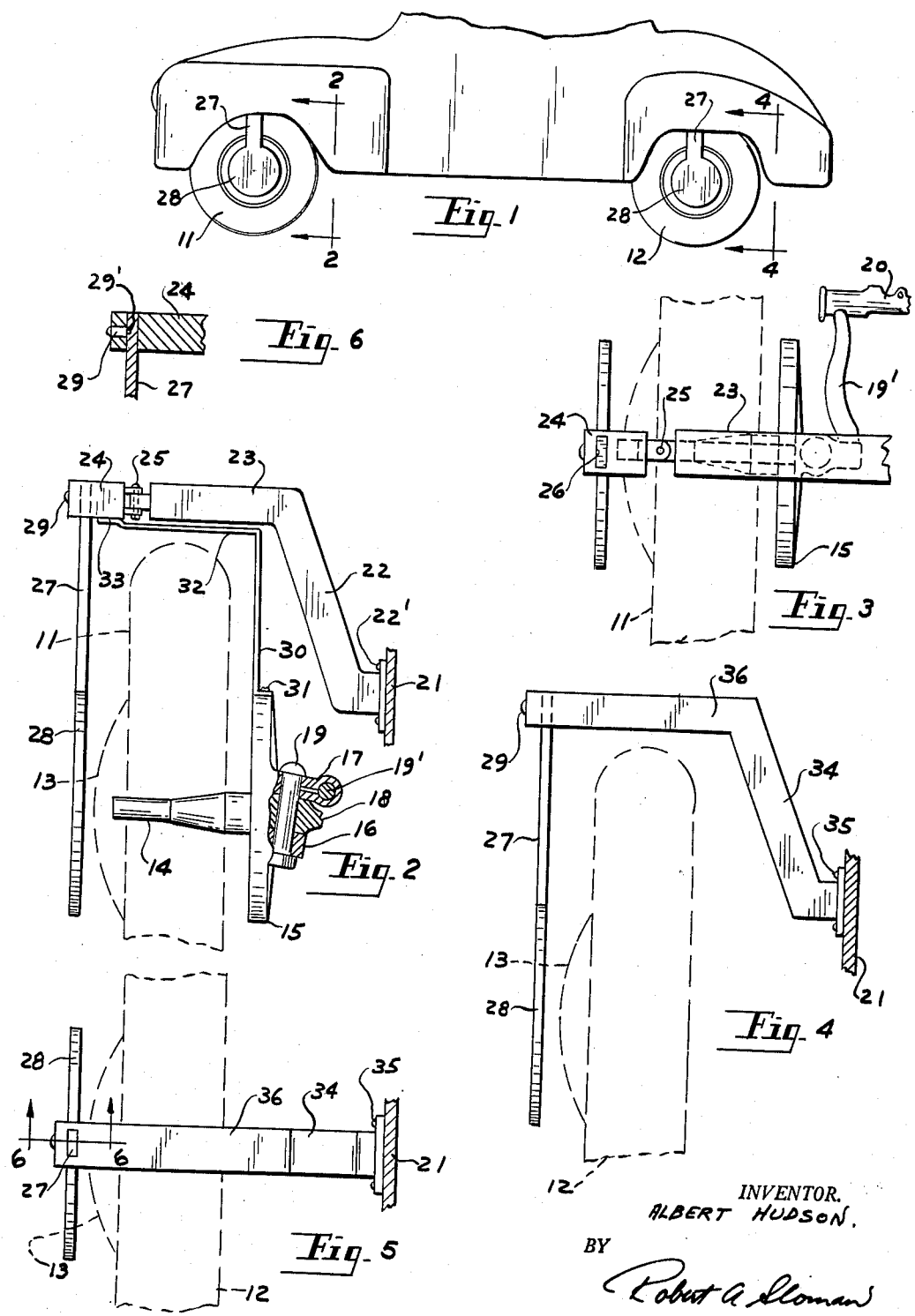

2,647,763

UNITED STATES PATENT OFFICE 2,647,763

VEHICLE WHEEL AND TIRE ANTITHEFT DEVICE

Albert Hudson, Detroit, Mich.

Application January 20, 1951, Serial No. 206,948

2 Claims. (Cl. 280—150)

This invention relates to a vehicle wheel protector and more particularly to a device mountable upon a vehicle and positionable over the vehicle hub cap and suitably locked in position whereby said hub cap may not be manually removed, or the wheel securing nuts removed without first removing said cover, said cover being in spaced relation to said hub cap.

It is the object of the present invention to provide a hub cap cover which is spaced laterally therefrom and independently mounted upon the vehicle frame and suitably locked in position.

It is the further object of the present invention to provide a hub cap cover together with a swivel mounting therefor which is joined to the front wheel steering linkage so as to turn therewith and to thus remain in substantial parallel relation to the wheel at all times.

These and other objects will be seen from the following specification and claims in conjunction with the appended drawing in which:

Fig. 1 is a partially broken away elevational view of a vehicle with the hub cap covers mounted in position.

Fig. 2 is a section taken on line 2—2 of Fig. 1.

Fig. 3 is a plan view thereof.

Fig. 4 is a section taken on line 4—4 of Fig. 1.

Fig. 5 is a fragmentary plan view thereof; and

Fig. 6 is a section taken on line 6—6 of Fig. 5.

It will be understood that the above drawing illustrates merely a preferred embodiment of the invention and that other embodiments are contemplated within the scope of the claims hereafter set out.

Referring to the drawing the vehicle fragmentarily shown in Fig. 1 has turnable front wheels 11 and rear wheels 12 which are respectively provided with the conventional ornamental hub cap 13 as illustrated in the drawing.

The wheel supporting and journalling spindle 14 of Fig. 2 has a circular plate 15 upon its inner end which includes the spaced slightly angular projections 16 and 17 which are pivotally mounted upon the vehicle wheel suspension 18 by means of the conventional king pin 19, in a manner which forms no part of the present invention.

As shown in Figs. 2 and 3 the wheel spindle is connected to the steering arm 19' and the tie rod 20 which is fragmentarily shown in Fig. 3, whereby the front wheels of the vehicle are turned as desired.

The present invention contemplates the attachment of an angular bracket 22 to the vehicle frame 21 at the points 22' as shown in Fig. 2 with said bracket terminating in the lateral extension 23 which is spaced above the vehicle tire or wheel 11 and normally below the inner surface of the vehicle front fender.

The swivel or hub cap cover supporting block 24 is pivotally or swivelly joined as at 25 to the outer portion of the bracket element 23 adjacent the outer side wall of the wheel as illustrated in Fig. 2.

Said block 24 has a vertical slot 26 therein which slidably receives the upper end of the cover supporting arm 27, as particularly illustrated in Fig. 6.

The circularly shaped hub cap cover 28 is arranged at the lower end of arm 27 and is spaced outwardly and in substantial registry over hub cap 13 in the manner illustrated in Figs. 1 and 2.

A suitable cylindrical type lock 29 is laterally projected inwardly within a corresponding cylindrical opening in the block 24 and has an inwardly and outwardly movable projection 29' which retainingly engages within a lateral slot adjacent the upper end of arm 27 for effectively retaining and securing the same with respect to the vertical opening 26 of block 24. By the insertion of a proper key an its operation the projection 29' may be withdrawn so as to permit the downward removal of the arm 27 from the slot 26 in block 24.

As the front wheels turn, it is naturally desirable that the arm and cover 28 similarly turn about their swivel mounting 25, and this is accomplished by the upright tie bar 30 which is secured at 31 to the upper portion of wheel spindle flange 15 and has a laterally extending portion 32 which is joined as at 33 to block 24. Thus as the wheel spindle is turned about its axis 19 in the conventional manner, there will be a similar turning of the tie rod 30—32 which will in turn cause a similar turning movement of the block 24 and the hub cap cover depending therefrom.

With the cover 28 in position as suspended in Fig. 2 it would be very difficult to remove the hub cap 13, and even more difficult, or impossible to attain access to the wheel securing bolts under the hub cap. Thus there is provided by the present construction a hub cap cover which makes stealing of the wheel or tire very difficult and practically impossible without in some manner breaking off the cover 28 and its supporting arm 27.

As the rear wheels of the vehicle do not turn it is merely necessary to provide, as in Figs. 4 and 5, an upwardly extending bracket 34 secured to the vehicle frame 21 as at points 35. Said bracket terminates in a horizontal rear wheel overhanging bracket element 36 which similarly has an upright transverse slot 26 such as is shown in Fig. 3, for receiving the supporting arm 27 of the hub cap cover 28.

Having described my invention reference should now be had to the claims which follow for determining the scope thereof.

I claim:

1. A vehicle wheel protector comprising a wheel overhanging bracket secured to the vehicle frame and projected laterally outward centrally above the vehicle front wheel, a bracket extension block swivelly mounted upon the outer end of said bracket and having a transverse vertical slot therein, a circular hub cap cover spaced from and in horizontal registry with the wheel hub cap, an upwardly extending supporting arm on said cover slidably projected within said transverse slot, a lock positioned within said block and having a locking element retainingly engageable with said arm for securing the same within said slot, and an L-shaped tie bar extending over said wheel and interconnecting the front wheel support and said block whereby said block will turn simultaneously with turning of said front wheel.

2. A wheel and tire protector for a vehicle having a frame and a front wheel supporting steering spindle comprising a wheel overhanging bracket secured at one end to said frame and projected laterally outward centrally above the vehicle front wheel, an extension block swivelly mounted upon the outer end of said bracket and having a transverse vertical slot therein, a circular hub cap cover spaced outwardly from and in horizontal registry with the wheel hub cap, an upwardly extending supporting arm on said cover slidably projected up into said transverse slot, a lock positioned within said block and having a locking element retainingly engageable with said arm for securing the same within said slot, and an L-shaped tie bar extending over said wheel and joined at one end to said block and at its other end to said spindle whereby said cover will turn corresponding to turning movements of said wheel.

ALBERT HUDSON.

References Cited in the file of this patent

UNITED STATES PATENTS

| Number | Name | Date |
| --- | --- | --- |
| 1,735,743 | Finn | Nov. 12, 1929 |
| 2,010,350 | Davis | Aug. 6, 1935 |
| 2,122,564 | Fergueson | July 5, 1938 |
| 2,312,537 | Fergueson | Mar. 2, 1943 |
| 2,333,356 | Blanchet | Nov. 2, 1943 |